(12) United States Patent
Mattes et al.

(10) Patent No.: US 8,108,097 B2
(45) Date of Patent: Jan. 31, 2012

(54) CONTROLLING VEHICLE DYNAMICS THROUGH THE USE OF AN IMAGE SENSOR SYSTEM

(75) Inventors: Bernhard Mattes, Sachsenheim (DE); Thomas Herrmann, Oehringen (DE)

(73) Assignee: Robert Bosch GmbH, Stuttgart (DE)

( * ) Notice: Subject to any disclaimer, the term of this patent is extended or adjusted under 35 U.S.C. 154(b) by 1412 days.

(21) Appl. No.: 10/534,107

(22) PCT Filed: Nov. 6, 2003

(86) PCT No.: PCT/DE03/03690
§ 371 (c)(1),
(2), (4) Date: Nov. 22, 2006

(87) PCT Pub. No.: WO2004/041611
PCT Pub. Date: May 21, 2004

(65) Prior Publication Data
US 2007/0095588 A1    May 3, 2007

(30) Foreign Application Priority Data

Nov. 8, 2002 (DE) .................................. 102 51 949

(51) Int. Cl.
*G06F 7/14* (2006.01)
*G06F 17/00* (2006.01)
*G06F 19/00* (2011.01)
*B60Q 1/00* (2006.01)
*B60Q 9/00* (2006.01)

(52) U.S. Cl. .............. 701/36; 701/37; 701/38; 340/901; 340/435; 340/438; 340/440; 356/614; 382/107

(58) Field of Classification Search ................ 701/1, 35, 701/36, 37, 38, 45, 48, 70–72; 340/901, 340/435, 436, 438, 440; 356/623, 631, 614; 382/104, 106, 107
See application file for complete search history.

(56) References Cited

U.S. PATENT DOCUMENTS

| | | | | | |
|---|---|---|---|---|---|
| 4,969,036 | A | * | 11/1990 | Bhanu et al. | 348/113 |
| 4,970,653 | A | * | 11/1990 | Kenue | 701/301 |
| 5,757,949 | A | * | 5/1998 | Kinoshita et al. | 382/104 |
| 5,850,176 | A | * | 12/1998 | Kinoshita et al. | 340/435 |
| 5,925,083 | A | * | 7/1999 | Ackermann | 701/41 |
| 6,130,706 | A | * | 10/2000 | Hart et al. | 348/148 |

(Continued)

FOREIGN PATENT DOCUMENTS

DE            699 00 126        11/2001

(Continued)

OTHER PUBLICATIONS

Patent Abstracts of Japan, vol. 0174, No. 12 (P-1583), Jul. 30, 1993.

(Continued)

*Primary Examiner* — Jack Keith
*Assistant Examiner* — Edward Pipala
(74) *Attorney, Agent, or Firm* — Kenyon & Kenyon LLP

(57) ABSTRACT

A method for controlling vehicle dynamics in a motor vehicle, at least one sensor recording at least one measured value; at least one actuator for controlling vehicle dynamics being driven as a function of the at least one measured value; at least one image sensor system generating image information from the motor-vehicle surround for controlling vehicle dynamics; at least two image sensors being provided which essentially record the same scene.

22 Claims, 6 Drawing Sheets

U.S. PATENT DOCUMENTS

| | | | |
|---|---|---|---|
| 6,477,260 B1 * | 11/2002 | Shimomura | 382/106 |
| 6,813,370 B1 * | 11/2004 | Arai | 382/104 |
| 7,362,215 B2 * | 4/2008 | Janssen | 340/426.25 |
| 2008/0119993 A1 * | 5/2008 | Breed | 701/46 |

FOREIGN PATENT DOCUMENTS

| | | |
|---|---|---|
| DE | 101 11 283 | 9/2002 |
| EP | 0 896 267 | 2/1999 |
| EP | 0 945 319 | 9/1999 |
| EP | 1 089 231 | 4/2001 |
| JP | 5 079850 | 3/1993 |

OTHER PUBLICATIONS

Leung, M.K. et al., "Estimating Three-Dimensional Vehicle Motion in an Outdoor Scene Using Stereo Image Sequences", International Journal of Imaging Systems and Technology, Wiley and Sons, New York, vol. 4, No. 2, Jul. 1, 1992.

Zanten, Erhardt, Pfaff, "VDC. The Vehicle Dynamics Control System of Bosch," Individual Conference Report, lecture: International Congress and Exposition, Feb. 27-Mar. 2, 1995, Detroit, Michigan, SAE Paper 950759, 1995.

* cited by examiner

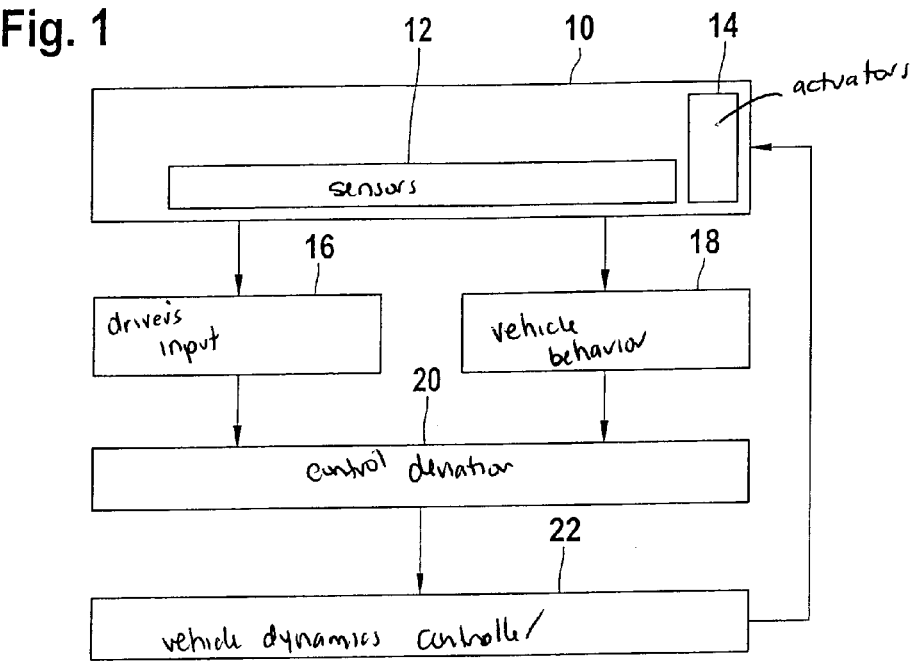
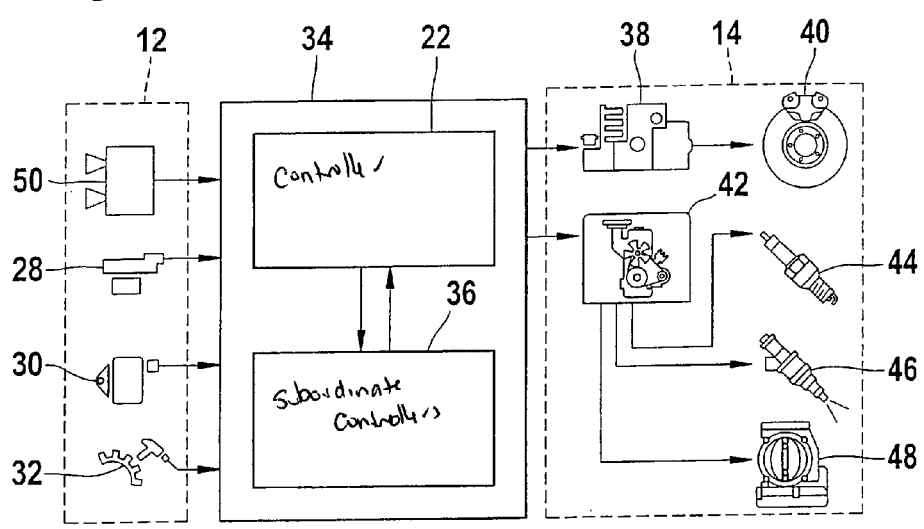

180
CONTROLLING VEHICLE DYNAMICS THROUGH THE USE OF AN IMAGE SENSOR SYSTEM

FIELD OF THE INVENTION

The present invention relates to a method and a device for controlling vehicle dynamics in a motor vehicle using at least one image sensor system composed of at least two image sensors which record basically the same scene.

BACKGROUND INFORMATION

Devices and methods for controlling vehicle dynamics in a motor vehicle are generally known. For example, a device and a method for controlling driving dynamics in a motor vehicle are described in Zanten, Erhardt, Pfaff: "VDC, The Vehicle Dynamics Control System of Bosch", Individual Conference Report, lecture: International Congress and Exposition, Feb. 27-Mar. 2, 1995, Detroit, Mich., SAE Paper 950759, 1995. Vehicle dynamics control is a system for keeping a motor vehicle stable and in the lane. This is achieved by selectively braking individual wheels of the motor vehicle. To this end, sensors are used to determine the driver's input, thus the nominal behavior of the motor vehicle, and the vehicle behavior, thus the actual behavior of the motor vehicle. In a processing unit/control unit, the difference between the nominal behavior and the actual behavior is ascertained as the control deviation, and the individual actuators, for example the wheel brakes, are controlled with the objective of minimizing the control deviation. As sensors, yaw rate sensors, lateral acceleration sensors, steering-wheel angel sensors, brake pressure sensors, and wheel speed sensors are used, in particular. There are no references to using at least one image sensor system composed of at least two image sensors which essentially record the same scene.

SUMMARY

An example method and device, as described below, for controlling driving dynamics in a motor vehicle may have at least one image sensor system, at least two image sensors being provided which record generally the same scene. The example method and device may have the advantage that the image sensor systems provided in motor vehicles are used for other functions. Stereo cameras are particularly advantageous. Image sensors systems and stereo cameras may be used, for example, as part of an automatic speed control and/or distance control, for example in the adaptive cruise control (ACC) system in a motor vehicle. Other possible applications of exterior video camera systems are, for example: precrash sensing, pedestrian detection, rollover detection. When the same image sensor system is used for a plurality of functions, the costs for such systems are reduced, because the costs per function are lowered. It is particularly advantageous to link the image sensor system and/or the stereo camera to a sensor platform, where various sensors are connected to a data bus and are used synergetically by various control units. This further reduces the costs per function. Thus, a broad application of the described functions is made possible in motor vehicles. In particular, a broad application of driving dynamics control in motor vehicles located in the highway space enhances traffic safety as a whole.

It may be advantageous if at least one measured value is determined from the generated image information, the measured value being used for vehicle dynamics control. By defining the at least one measured value, a simple linking of the image sensor system to the vehicle dynamics control is made possible, since a defined measured value is available for the vehicle dynamics control. This enables an image sensor system to be simply adapted to the vehicle dynamics control, since the specific properties of the image sensor system, such as spatial resolution and/or gray-scale resolution and/or color resolution and/or sampling frequency, do not enter into the vehicle dynamics control.

Defining at least one fixed image point and subsequently determining the image coordinates of the image point in at least two images of one image sequence advantageously leads to a rapid and fault-tolerant determination of at least one measured value for controlling vehicle dynamics from the generated image information of the image sensor system.

It may be advantageous if at least one rotational vector of the motor vehicle and/or at least one motion vector of the motor vehicle from the generated image information is/are determined. Besides determining the yaw rate and/or the yaw angle and/or the lateral acceleration, it may be particularly advantageous to alternatively or additionally determine other motion vectors in the three main axes of the motor vehicle and/or other rotational vectors about the same. Determining the roll acceleration and/or the roll velocity and or the roll angle advantageously makes it possible to detect in advance and prevent a sideways rollover of the motor vehicle. By suitably controlling actuators, for example individual wheel brakes in the context of the vehicle dynamics control, a sideways rollover of the vehicle may be prevented. In motor vehicles having a high center of gravity, such as small delivery trucks, this function advantageously improves traffic safety. By determining the pitch acceleration and/or the pitch velocity and/or the pitch angle, dangers may be recognized which arise from an excessive pitching motion of the motor vehicle. Within the context of the vehicle dynamics control, for example, the motor vehicle is prevented from rolling over the rear axle by suitably controlling actuators, for example individual wheel brakes. In motor vehicles having short wheel bases, such as in two-seater motor vehicles designed for city traffic, this function improves traffic safety. It may be advantageous to determine all three motion vectors in the three main axes of the motor vehicle and the corresponding rotational vectors about the same. This makes it possible to detect the vehicle motion three-dimensionally. While conventional vehicle dynamics controls employ the yaw rate and the lateral acceleration to model the vehicle motion, the method, the device, and the processing unit/control unit described in the following make it possible to model the vehicle motion three-dimensionally. This additional information leads to an advantageous improvement in the vehicle dynamics control, since the three-dimensional vehicle motion is reliably and completely recorded.

Determining the yaw rate and/or the yaw angle and/or the lateral acceleration of the motor vehicle from the generated image information may make it possible to use the image sensor system as a yaw rate sensor and/or as a lateral acceleration sensor for controlling vehicle dynamics. This advantageously results in a cost reduction because the image sensor system alternatively or simultaneously assumes the function of the yaw rate sensor or of the lateral acceleration sensor. Since the image sensor system is used in many diverse ways for a plurality of functions, the costs per function are advantageously lowered. The image sensor system may make it possible to reliably and quickly determine the yaw rate and/or the yaw angle and/or the lateral acceleration of the motor vehicle.

It may be advantageous to determine the three-dimensional rotational motion and/or the three-dimensional translational motion of the motor vehicle as a function of image information from at least one image sensor system, in particular from a stereo camera, since this enables the dynamics of the motor vehicle to be determined independently of road contact. In addition, besides at least one image sensor system disposed in and/or oppositely to the direction of travel, it is beneficial for at least one second image sensor system to be mounted transversely to the direction of travel, since this contributes to an improved three-dimensional determination of the motor vehicle motion.

In the method for controlling vehicle dynamics and/or in the method for determining the motion of a motor vehicle, it may be especially beneficial for at least one fixed image point to be defined as a function of the generated image information. The example method and the corresponding devices are further improved by determining a measured value for vehicle dynamics control and/or by determining the three-dimensional rotational motion and/or the three-dimensional translational motion as a function of the at least one specific, fixed image point.

By using more than one image sensor system having at least two image sensors which record substantially the same scene, it is advantageously possible to determine the differences between the two position vectors to the same image point and, from their variation, to calculate the spatial translational and rotational motion vectors of the vehicle. In this context, the measured values are determined by at least two image sensor systems independently of one another.

A computer program having program-code means for implementing all of the steps of the example method described in the following may be especially advantageous when the program is executed on a computer. By using a computer program, it is possible to adapt the method quickly and cost-effectively, for example by adapting parameters to the particular vehicle type and/or to components of the vehicle dynamics control. Moreover, maintenance procedures are advantageously facilitated, since the individual method steps are not implemented by hardware, but rather by software.

A sensor unit having at least one image sensor system may be advantageous, means being provided for determining at least one rotational vector and/or at least one translational motion vector. In addition to its use in vehicle dynamics controls, the sensor unit may advantageously be used outside the field of motor vehicle technology. In this context, the field of application of the sensor unit extends to fields of application where at least one rotational vector and/or at least one motion vector of a moving and/or accelerated object is required. By mounting the sensor unit on the object, the required vectors are obtained from the image information from the surroundings. Thus, when properly installed in a motor vehicle, this sensor unit is advantageously suited for determining the yaw rate and/or the yaw angle and/or the lateral acceleration of the motor vehicle. Thus, this sensor unit may be used as a sensor for the method described in the following and for the device for vehicle dynamics control, as described in the following.

Further advantages are derived from the following description of exemplary embodiments, with reference to the figures and as set forth in the dependent claims.

BRIEF DESCRIPTION OF THE DRAWINGS

The present invention is explained in greater detail below with reference to specific example embodiments illustrated in the figures.

FIG. 1 shows a block diagram of the vehicle dynamics control in a motor vehicle, in a preferred exemplary embodiment.

FIG. 2 shows a general plan of the vehicle dynamics control in a motor vehicle, in a preferred exemplary embodiment.

DETAILED DESCRIPTION OF EXAMPLE EMBODIMENTS

Figure 3:
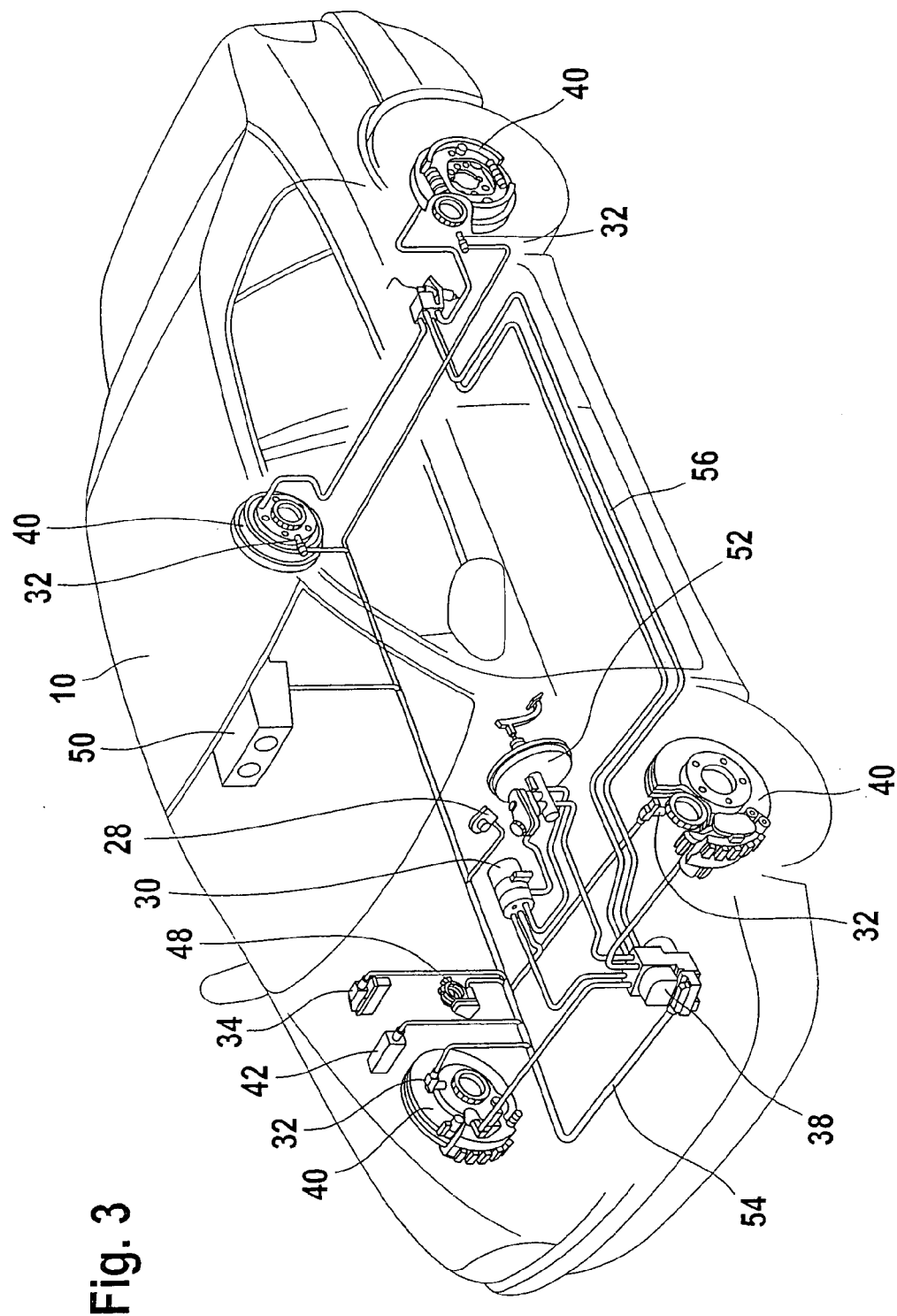
FIG. 3 shows a drawing showing the arrangement of the components of the vehicle dynamics control in a motor vehicle, in a preferred exemplary embodiment.

FIG. 1 shows a block diagram of the vehicle dynamics control in a motor vehicle 10 in a preferred exemplary embodiment, including sensors 12, actuators (control elements) 14, driver's input (nominal behavior) 16, vehicle behavior (actual behavior) 18, control deviation 20, and vehicle dynamics controller 22. It is the aim of the vehicle dynamics control to keep motor vehicle 10 stable and in the lane. Driver's input 16 is ascertained by sensors 12 situated in motor vehicle 10. Vehicle behavior 18 is determined in parallel by sensors 12. Control deviation 20 is calculated from driver's input 16 and vehicle behavior 18. Control deviation 20 is used as the input variable for driving dynamics controller 22. Driving dynamics controller 22 controls the actuators (control elements) 14 with the objective of minimizing control deviation 20. As actuators 14, the wheel brakes and/or the engine of motor vehicle 10 are used in particular. By adjusting the braking and tractive forces at the wheels of motor vehicle 10 in dependence upon the particular situation, motor vehicle 10 is individually steerable, and the desired driving behavior is achieved even in critical driving situations. Thus, the vehicle dynamics control lessens the danger of a collision, the danger of a rollover, and/or the danger of vehicle 10 swerving out of the lane.

FIG. 2 shows a general plan of the vehicle dynamics control in a motor vehicle, in a preferred exemplary embodiment, including sensors 12, a processing unit/control unit 34, and actuators 14. As sensors 12, a stereo camera 50, a steering-wheel angel sensor 28, a brake pressure sensor 30, and wheel speed sensors 32 are used. In the preferred exemplary embodiment, stereo camera 50 is used to determine the yaw rate, the yaw angle and the lateral acceleration. The yaw rate of the motor vehicle is understood to be the rotational speed of the motor vehicle produced by a rotational motion of the motor vehicle about its vertical axis, while the lateral acceleration of a motor vehicle describes the acceleration perpendicularly to the direction of travel and in parallel to the roadway. The yaw angle is the angle of rotation of the motor vehicle about its vertical axis relative to an earlier motor vehicle position. In the preferred exemplary embodiment, the yaw angle is determined as an accumulated yaw angle from the yaw rate. Steering-wheel angel sensor 28 records the steering wheel angle of the motor vehicle. Brake pressure sensor 30 is positioned in the brake system and is used to detect brake activation by the driver. Four wheel-speed sensors 32 are connected respectively to one wheel each of the motor vehicle and are used to determine the rotational speed of the wheels of the motor vehicle. Processing unit/control unit 34 processes the information of sensors 12. It has an internal controller hierarchy. In this context, the distinction is made between higher-level vehicle dynamics controller 22 and subordinate controllers 36. With respect to subordinate controllers 36, in the preferred exemplary embodiment, one distinguishes between the brake slip controller, the traction slip controller, and the engine-drag torque controller. To determine the driver's input, signals from steering-wheel angel sensors 28 and brake pressure sensors 30 are analyzed. Also included in the calculation of the driver's input are the frictional coefficients and the vehicle speed. These additionally calculated parameters are estimated from the signals from wheel-speed sensors 32, stereo camera 50 and brake pressure sensors 30. The vehicle behavior is determined from the signals of stereo camera 50 and from a sideslip angle of the motor vehicle estimated in processing unit/control unit 34 from the sensor signals. Vehicle dynamics controller 22 controls the two state variables, yaw rate and attitude angle, of the motor vehicle. As actuators 14, wheel brakes 40 are used, which are driven via hydraulic modulator 38. As additional actuators 14, ignition angle 44, fuel injection 46, and throttle valve 48 are controlled via the control unit of engine management 42. In the preferred exemplary embodiment, a stereo camera 50 is used, which is composed of two image sensors which form an image of the same scene, however at a slightly different viewing angle. As image sensors, CCD image sensors and/or CMOS image sensors are used. Stereo camera 50 transmits image information on the vehicle surround to processing unit/control unit 34. The image information from stereo camera 50 is transmitted electrically and/or optically to processing unit/control unit 34 via a signal line. Alternatively or additionally, the image information may be transmitted by radio. In the preferred exemplary embodiment, stereo camera 50 has a range of approximately 4 meters to 40 meters, a vertical angular aperture of about 17 degrees and a sampling rate of 10 milliseconds. Processing unit/control unit 34 is made up of a plurality of modules shown in FIG. 5, which, in the preferred exemplary embodiment, are constituted as programs of at least one microprocessor. In the preferred exemplary embodiment, the described device and the method described in the following enable a vehicle-stabilization state sensing to be implemented for purposes of controlling vehicle dynamics using a stereo camera 50.

FIG. 3 shows the arrangement of the components of the vehicle dynamics control in a motor vehicle 10, in a preferred exemplary embodiment. In the preferred exemplary embodiment, sensors 28, 30, 32, 48, 50, actuators 38, 42, and processing unit/control unit 34 are connected via a CAN bus 54. CAN bus 54 is a communications data bus. As sensors, steering-wheel angel sensor 28, brake pressure sensor 30, four wheel-speed sensors 32, and stereo camera 50 are used. The control unit of engine management 42 including throttle valve 48, and hydraulic modulator 38 are drawn in as actuators. Hydraulic modulator 38 is in hydraulic communication via hydraulic lines 56 with four wheel brakes 40, and with brake booster having master cylinder 52.

Figure 4:
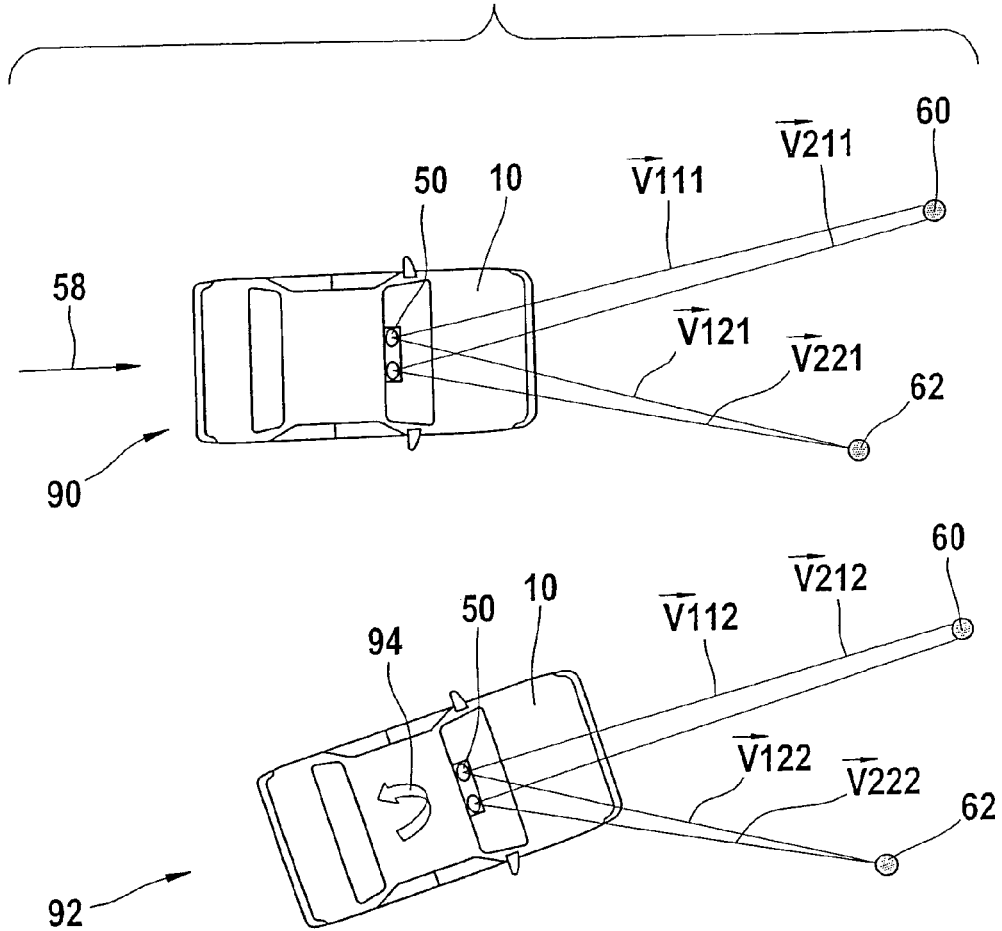
FIG. 4 shows a motor vehicle having a stereo camera, in a preferred exemplary embodiment.

In a preferred exemplary embodiment, FIG. 4 shows a motor vehicle 10 having a stereo camera 50 in a first viewing instant 90 and in a second viewing instant 92. Stereo camera 50 is mounted in motor vehicle 10 in the area of the inside rearview mirror, behind the windshield. The viewing direction of stereo camera 50 is in travel direction 58 of motor vehicle 10. In this context, stereo camera 10 captures image information from the motor-vehicle surround. A first fixed image point 60 and a second fixed image point 62 are sketched in the motor-vehicle surround. Fixed image points are, for example, lane markings and/or traffic signs and/or poles and/or trees and/or roadside posts (mileage markers) and/or houses. In both viewing instants 90, 92, vectors V are sketched in each case from the middle of the image sensor lens of the two image sensors of stereo camera 50 to the two fixed image points 60, 62. In this context, the first index of vector V designates the image sensors, while the second index indicates image points 60, 62. The third index indicates the instant of time of the vector. Thus, for example, $V_{212}$ denotes vector V from the second image sensor to first fixed image point 60 at second viewing instant 92. Vectors $V_{111}$, $V_{121}$, $V_{112}$, $V_{122}$, $V_{211}$, $V_{221}$, $V_{212}$ and $V_{222}$ are drawn in. The x-components of the vectors change in response to a yawing motion 94 of motor vehicle 10 from a first viewing instant 90 to a second viewing instant 92. In this case, two vehicle-fixed Cartesian coordinate systems are assumed. In the preferred exemplary embodiment, the zero points of the coordinate systems each lie in the middle of the image sensor lens. In order to detect vehicle stability, the processing unit/control unit synchronously calculates the vectors to a multiplicity of image points 60, 62 and/or to a cluster of pixels from the image information of the two image sensors of stereo camera 50. In the process, the vectorial variation between the individual images is considered. As clusters of pixels, hundreds of pixels are used, for example. Alternatively, it is possible to use a larger and/or smaller number of the same. If the x-components of the vectors of the two image sensors 60, 62 of stereo camera 50 vary too greatly from one sampling operation to the next, thus from a first viewing instant 90 to a second viewing instant 92, for the same sampled points, then an unstable driving condition exists. The processing unit/control unit derives the information pertaining to rotation about the Z-axis and/or the lateral acceleration of the motor vehicle from the vectors of the individual images and, on the basis of this information, calculates the yaw rate and/or the accumulated yaw angle and/or the lateral acceleration.

Figure 5:
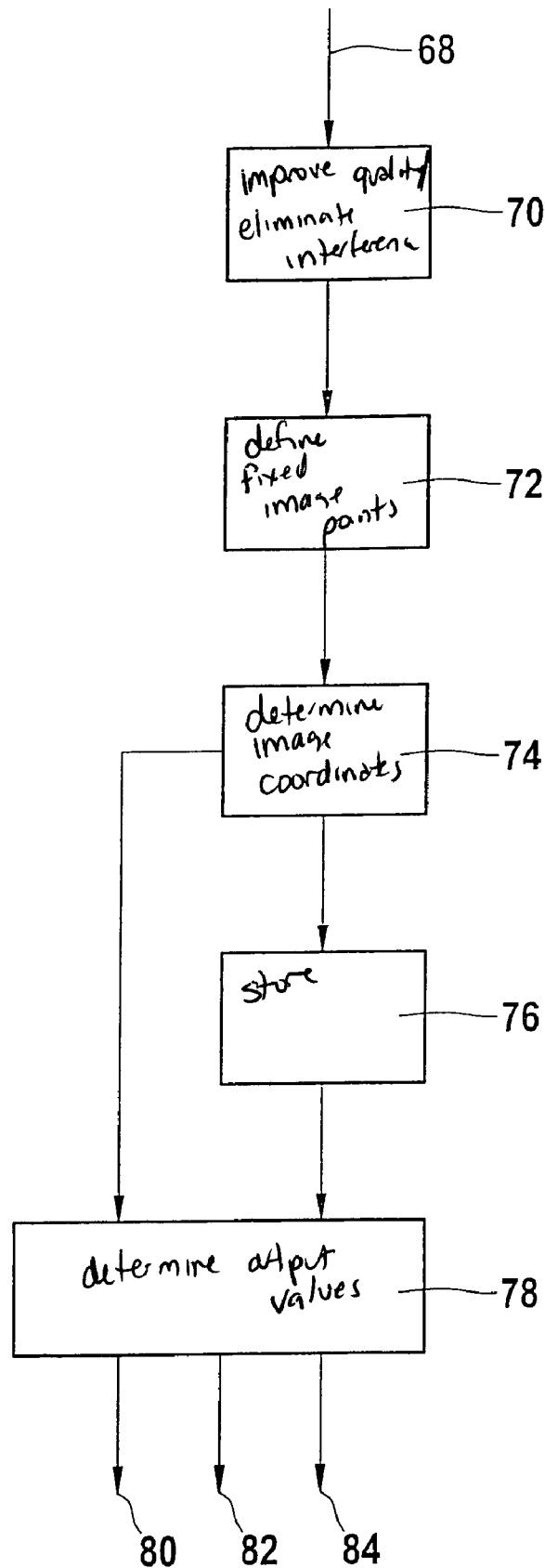
FIG. 5 shows a flow chart of the method for vehicle dynamics control in a motor vehicle, in a preferred exemplary embodiment.

FIG. 5 shows a flow chart of the method for vehicle dynamics control in a motor vehicle, in a preferred exemplary embodiment. Yaw rate 80 and/or yaw angle 82 and/or lateral acceleration 84 are determined from image information 68 of the stereo camera. Image information 68 is supplied to module 70 for preprocessing. Module 70 is used, in particular, for improving the image quality and/or for eliminating interference. Fixed image points are defined in module 72. Fixed image points are, for example, lane markings and/or traffic signs and/or poles and/or trees and/or roadside posts (mileage markers) and/or houses and/or relatively large rocks (>approximately 10 cm diameter). This is possible using cameras having 640×480 pixels in accordance with the VGA standard (VGA=video graphics array).

A distinction from movable image points is made possible in that, considered in the longitudinal vehicle direction, the component of the change in the distance to these movable image points changes as a first approximation at a different rate than the motor vehicle's own velocity. Thus, a distinction between movable and fixed image points is possible. Other criteria are needed for image point movement perpendicularly to the travel direction of the motor vehicle, such as another motor vehicle that is crossing. In the case of a crossing motor vehicle, for example, the wheel rotations of the crossing motor vehicle are used as non-consideration criteria, so that movable image points are reliably detected. As an alternative or additional criterion, a fixed image point is any image point whose image coordinates only change between two measuring cycles in accordance with estimations made on the basis of the traveling speed and the radius of turn of the motor vehicle. In this context, measured data from other sensors may be used, such as steering angle sensors or wheel speed sensors. The process of determining fixed image points in module 72 is based on conventional methods of image processing, in particular image segmentation, feature determination, and object recognition. When working with the stereo camera, the image coordinates are able to be determined in particular using the triangulation method. Module 74 is used to determine image coordinates of the defined, fixed image points. In the case of a single image point, the image coordinates are directly determined, while, in the case of a cluster of pixels, a centroid of the cluster is ascertained, and the image coordinates are derived therefrom. Accordingly, a fixed image point is either ascertained by a single point (pixel) or by a cluster of pixels. The image coordinates of the defined, fixed image points are either stored in module 76 and/or transmitted to module 78 for determining the output values. By comparing the stored image coordinates in module 76 of the preceding images with the image coordinates of the active image, the vectorial image variations and, from these, the output values, yaw rate 80 and/or yaw angle 82 and/or lateral acceleration 84, derived therefrom are determined in module 78.

Figure 6:
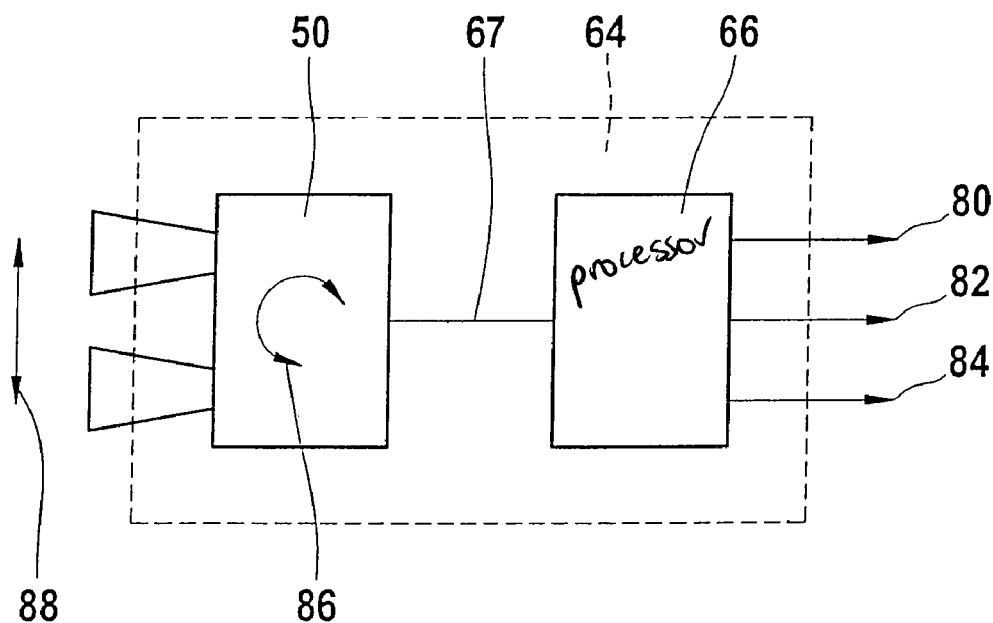
FIG. 6 shows a sensor unit.

FIG. 6 shows a sensor unit 64 composed of an image sensor system 50 and a processor 66. The image sensor system is made up of two image sensors which essentially record the same scene. Alternatively, the use of a stereo camera is possible. As image sensors, CCD image sensors and/or CMOS image sensors may be used, for example. Via signal line 67, image information is transmitted from image sensor system 50 to processor 66. The transmission is carried out electrically and/or optically. Alternatively or additionally, a transmission by radio is possible. In this exemplary embodiment, in accordance with the described method in FIG. 5, yawing motion 86 and/or lateral motion 88 are determined, and yaw rate 80 and/or yaw angle 82 and/or lateral acceleration 84 of sensor unit 64 are made available as output values. Processor 66 is composed of a plurality of modules shown in FIG. 5, which, in this exemplary embodiment, are constituted as programs of at least one microprocessor. In this exemplary embodiment, image sensor system 50 and processing means 66 form one unit. Alternatively, it is possible for the components to be separated into image sensor system 50 and processor 66. In another variant of sensor unit 64, other means are provided for determining at least one further rotational vector and/or at least one further motion vector. In another variant, additional image sensor systems are used to render possible a redundancy and/or a plausibility function. The field of application of the described sensor unit 64 is not limited to automotive engineering or technology. Rather, sensor unit 64 makes it generally possible to determine at least one rotational vector and/or at least one motion vector with respect to the sensor unit.

Figure 7:
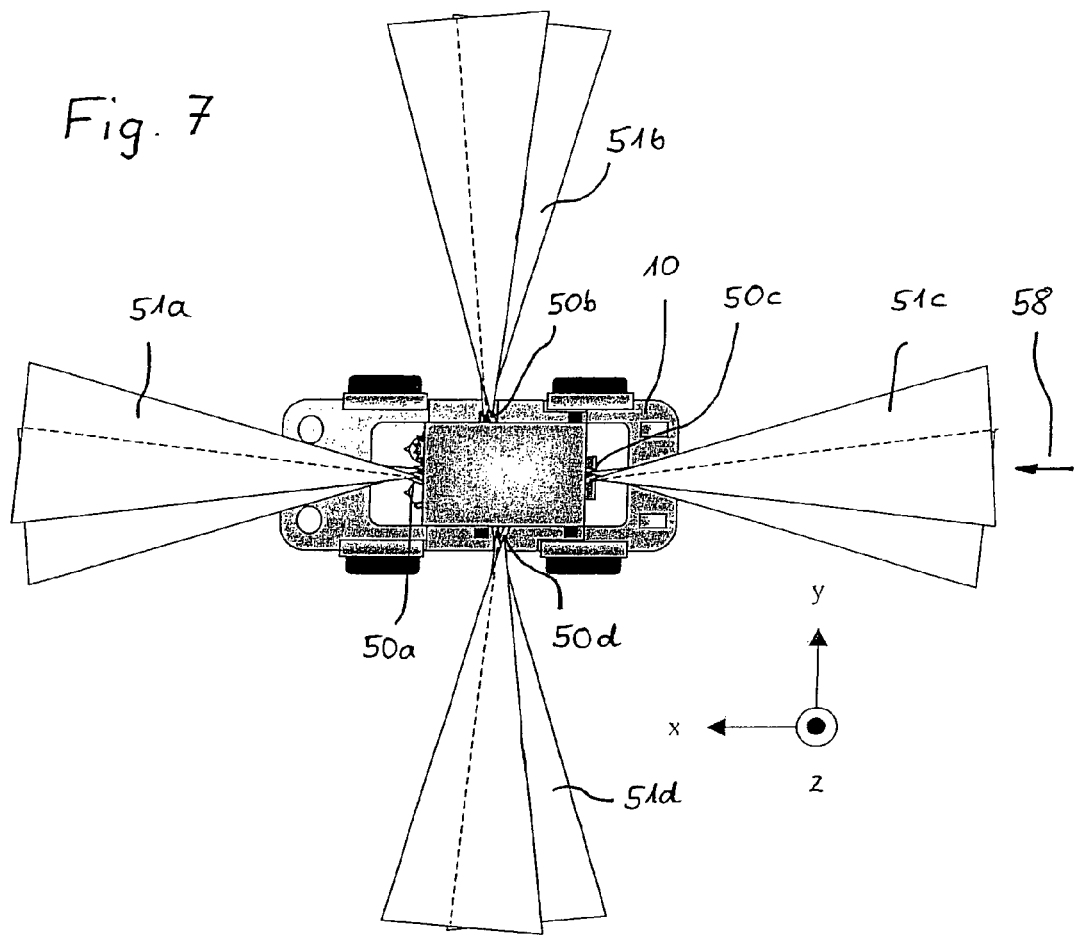
FIG. 7 shows a motor vehicle of another exemplary embodiment, in a plan view.

FIG. 7 shows a motor vehicle 10 of another exemplary embodiment in a plan view, including a first stereo camera 50a, a second stereo camera 50b, a third stereo camera 50c, and a fourth stereo camera 50d. First stereo camera 50a is mounted in motor vehicle 10 in the area of the inside rearview mirror, behind the windshield. Viewing direction 51a of first stereo camera 50s is in travel direction 58 of motor vehicle 10. Third stereo camera 50c is mounted in the area of the license plate on the tailgate of motor vehicle 10. Viewing direction 51c of third stereo camera 50c is opposite travel direction 58 of motor vehicle 10. Second and fourth stereo cameras 50b, 50d are mounted in the area of the center pillar of motor vehicle 10 in such a way that their viewing directions 51b, 51d are disposed transversely to the travel direction of motor vehicle, to the left and, respectively, to the right of the same. In addition, FIG. 7 shows the vehicle-fixed Cartesian coordinate system having axes x, y, z, whose zero points each lie in the middle of the camera lenses. In this further exemplary embodiment, the dynamics (motion), thus, in particular, the three-dimensional translational and/or the three-dimensional rotational vectors of motor vehicle 10 are also measured independently of road contact, as a function of image information from stereo cameras 50a, 50b, 50c, 50d. In order to capture the vehicle's motion three-dimensionally, it is necessary to have at least one stereo camera looking in the longitudinal direction of the vehicle and/or one stereo camera looking in the transversal direction of the vehicle. In this further exemplary embodiment, however, altogether four stereo cameras 50a, 50b, 50c, 50d are used, which enable the motor vehicle's motion to be determined redundantly. In this exemplary embodiment as well, besides being used to determine the motion of the motor vehicle in order to provide or support other functions, stereo cameras 50a, 50b, 50c, 50d are potentially used to produce a full panoramic view, as needed for precrash front detection and/or precrash side detection and/or precrash rear-impact detection and/or theft detection and/or vandalism detection in the case of a parked motor vehicle 10. The longitudinal vehicle-speed component of motor vehicle 10 is made available in this exemplary embodiment via the CAN bus or via a fast sensor bus. In addition, the lateral velocity component, which is formed by the integral of a low-g lateral acceleration sensor, is used as a measured value for controlling vehicle dynamics. As already described above in the first exemplary embodiment, in this way, fixed image points are detected and distinguished from moving image points in front of and to the side of motor vehicle 10, since the distance of the latter to the camera changes at a rate that does not correspond to the available longitudinal vehicle-velocity component and, laterally, does not correspond to the lateral vehicle-velocity component. In this exemplary embodiment, to determine the three-dimensional vehicle motion, fixed image points are used, preferably fixed image points on the road surface. As a supplement to the method already clarified with reference to FIG. 4, the following describes how the three-dimensional rotational motion and the three-dimensional translational motion of motor vehicle 10 are determined.

Determining the rotational vector and the rotational angle about the z-axis:

For the x-direction and for the y-direction, respectively, two vehicle-fixed Cartesian coordinate systems are assumed, each having zero points in the middle of the camera lenses. In response to a yawing motion of motor vehicle 10, the x-components of the sampled vectors of first stereo camera 50a change from one sampling instant to the next, measurably, in terms of absolute value, and in a different direction relative to the vehicle-fixed coordinate systems having the x-direction in the longitudinal vehicle axis. The y-components change measurably and in the same direction. The yaw rate is determined from the rate of change of the x- and y-components and/or from the integrated yaw rate of the yaw angle. In addition, the yaw rate of motor vehicle 10 is also measured using second stereo camera 50b. In this case, it is measurably and equally proportional to the change in the y-components of the sampled vectors from one sampling instant to the next. The x-components change measurably and unequally. This applies analogously to the third and fourth stereo cameras 50c, 50d. When measurements are carried out using two stereo cameras, for example using first stereo camera 50a and second stereo camera 50b, adequate redundancy is achieved with respect to the measuring results.

Determining the rotational vector and the rotational angle about the x-axis:

In response to a rolling motion of motor vehicle 10, the z-components of the sampled vectors of first stereo camera 50a change from one sampling instant to the next, measurably, unequally, and in an opposite direction relative to the vehicle-fixed coordinate systems having the x-direction in the longitudinal vehicle axis. The x-components change measurably and equally. The roll rate is derived from the rate of change of the z- and x-components, and/or the roll angle is derived from the integrated roll rate. The aforementioned applies analogously to the other stereo cameras 50b, 50c, 50d. For example, for second stereo camera 50b, the z-components change measurably and equally, the x-components also change measurably and unequally.

Determining the rotational vector and the rotational angle about the y-axis:

In response to a pitching motion of motor vehicle 10, the z-components of the sampled vectors of first stereo camera 50a change from one sampling instant to the next, measurably, to the same extent, and in the same direction relative to the vehicle-fixed coordinate systems having the x-direction in the longitudinal vehicle axis. The x-components also change measurably and equally. The pitch rate is derived from the rate of change of the z- and x-components, and the pitch angle is derived from the integrated pitch rate. The aforementioned applies analogously to the other stereo cameras 50b, 50c, 50d. For example, for second stereo camera 50b, the z-components change measurably, unequally, and oppositely. The x-components change measurably, to an unequal extent, and in the same direction (as a function of driving speed).

Determining the velocity vector in the x-direction:

Here, the change in an x-component from first stereo camera 50a and/or second stereo camera 50b is measured, and the results corrected by the influences of the roll, pitch, and yaw rates. This applies correspondingly to other stereo cameras 50c, 50d. As speed increases, these influences become less and less and are disregarded in an approximation calculation. The distance traveled in the x-direction is determined from the integrated x-velocity.

Determining the velocity vector in the y-direction:

Here, the change in a y-component from first stereo camera 50a and/or second stereo camera 50b is measured, and the results corrected by the influences of the roll, pitch, and yaw rates. This applies correspondingly to other stereo cameras 50c, 50d. These influences may be relatively substantial in this case, in any case greater than in the case of the x-velocity. The distance traveled in the y-direction is determined from the integrated y-velocity.

Determining the velocity vector in the z-direction:

Here, the change in a z-component from first stereo camera 50a and/or second stereo camera 50b is measured, and the results corrected by the influences of the roll, pitch, and yaw rates. This applies correspondingly to other stereo cameras 50c, 50d. These influences may be relatively substantial in this case, in any case greater than in the case of the x-velocity. The distance traveled in the y-direction is determined from the integrated z-velocity.

Figure 8:
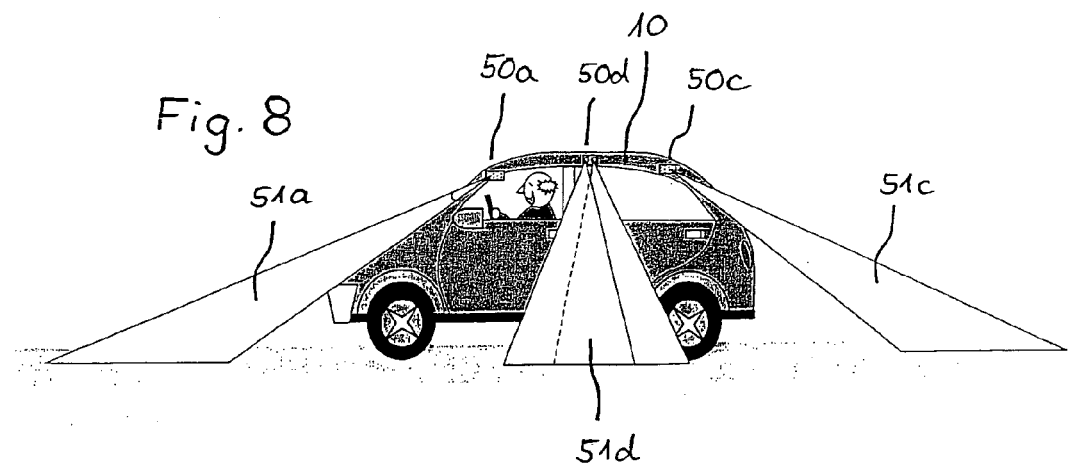
FIG. 8 shows a motor vehicle of another exemplary embodiment, in a lateral view.

FIG. 8 shows motor vehicle 10 in accordance with FIG. 7 of the other exemplary embodiment in a side view. Sketched in next to first stereo camera 50a having viewing direction 51a in the travel direction of the motor vehicle and third stereo camera 50c having viewing direction 51c counter to the travel direction of the motor vehicle is fourth stereo camera 50d having viewing direction 51d laterally with respect to motor vehicle 10, thus transversely to the travel direction of motor vehicle 10.

As explained above, the described methods and devices for controlling vehicle dynamics and/or for determining the motion of a motor vehicle are not limited to an individual stereo camera that is aligned in the travel direction of the motor vehicle. Rather, it is possible to use at least one image sensor system, at least two image sensors being provided which record generally the same scene. When more than two image sensors are used, the accuracy of the method is enhanced. Besides installing the stereo camera and/or the image sensor system having at least two image sensors in the travel direction of the motor vehicle, alternative installation possibilities are conceivable. For example, an installation counter to and/or sideways with respect to the travel direction are possible.

In another variant of the described method, device and sensor unit, in addition or alternatively to CCD image sensors and/or the CMOS image sensors, other image sensors, such as CCD line-array sensors, are used which produce image information. In this context, image information is information contained in electromagnetic radiation in the ultraviolet radiation range, in the infrared radiation range, and/or in the visible radiation range of the electromagnetic radiation spectrum. As image information, the intensity and/or the wavelength and/or the frequency and/or the polarization are used in particular.

In one variant of the described method and device, at least one rotational vector and/or at least one motion vector of the motor vehicle are determined from the generated image information. A rotational vector is a rotating vector of the motor vehicle about any axis, rotational vectors in a main axis of the motor vehicle preferably being determined. The main axes of the motor vehicle are the vertical axis, the transversal axis, and the longitudinal axis. A motion vector of the motor vehicle is a vector of the motion of the motor vehicle's center of gravity in any direction at all. Motion vectors in a main axis of the motor vehicle are preferably determined. In this context, the yaw acceleration and/or the pitch acceleration and/or the roll acceleration and/or the yaw rate and/or the pitch velocity and/or the roll velocity and/or the yaw angle and/or the pitch angle and/or the roll angle and/or the lateral acceleration and/or the longitudinal acceleration and/or the vertical acceleration and/or the transversal velocity and/or the longitudinal velocity and/or the vertical velocity and/or the transversal path and/or the longitudinal path and/or the vertical path of the motor vehicle are determined. The term "pitch" describes a rotational vector about the transversal axis of the motor vehicle, thus normal to the vertical axis and to the longitudinal axis. For example, the pitch acceleration is the rotational acceleration of the motor vehicle in the direction of the traversal axis of the motor vehicle. On the other hand, the term "roll" describes a rotational vector about the longitudinal axis of the motor vehicle. For example, the roll acceleration is the rotational acceleration of the motor vehicle in the direction of the longitudinal axis of the motor vehicle. In addition, the term "vertical" describes a motion vector in the direction of the vertical axis of the motor vehicle, while the terms "longitudinal" and "transversal" describe a motion vector in the direction of the longitudinal axis and of the transversal axis. In another advantageous variant of the described method and device, all three described motion vectors in the three main axes of the motor vehicle along with the corresponding rotational vectors about the same are determined. In the process, the vehicle motion is detected three-dimensionally and modeled.

In another variant of the described method and device, at least two image sensor systems having at least two image sensors, in particular at least two stereo cameras, are used which record generally the same scene. This renders possible a redundancy function and/or a plausibility function of the method described above. Using the redundancy function, at least one rotational vector and/or at least one motion vector are determined independently of the two image sensor systems, and the measured value is determined by mean value generation. The plausibility function makes it possible to check the measured values of the two image sensor systems in that the measured values are compared.

In one variant of the described method and device, in addition to the at least one image sensor system, at least one yaw rate sensor and/or at least one lateral acceleration sensor for controlling vehicle dynamics are used as sensors. In this advantageous variant, the image sensor system is used for performing a plausibility check. The measured values of the yaw rate sensor and/or of the lateral acceleration sensor are compared to the at least one measured value determined by the image sensor system. Alternatively or additionally thereto, the image sensor system is used to redundantly determine at least one measured value. This is accomplished by generating the mean value of the at least one measured value of the image sensor system, of the at least one measured value of the yaw rate sensor, and/or of the at least one measured value of the lateral acceleration sensor. Yaw rate sensors are sensors for measuring the yaw rate of a motor vehicle. Lateral acceleration sensors are inertia sensors for determining the lateral acceleration of a motor vehicle.

To economize on current consumption, another variant of the above-described method provides in defined operating situations, such as a parked vehicle, for at least one image sensor system to be switched to a stand-by operation and placed in operational readiness, thus "woken up" as a function of at least one signal from another sensor which monitors the immediate vehicle surround. Accelerometers and/or electrical field sensors are used as sensors for monitoring the vehicle surround. The electric field sensors make it possible to detect changes in the dielectric loss resistances caused by people located in direct proximity to the sensor, when working with a suitable measuring frequency, for example 500 kHz, which changes by >20% since people contain >60% water.

Specifically, therefore, it is possible to detect the proximity of undesirable living things, i.e., people. The identity of desirable people, such as of the vehicle owner, is recognized by the transponders contained in their ignition keys, as in keyless entry systems; the image sensor systems then remain inactive, since there is no need to monitor the vehicle surround.

What is claimed is:

1. A method for controlling vehicle dynamics in a motor vehicle, comprising:
generating, by at least two image sensor systems, image information from surroundings of a motor-vehicle to control the vehicle dynamics, each image sensor system including at least two image sensors to record a same scene for the image information, a first one of the at least two image sensor systems being oriented along a longitudinal axis of the vehicle and a second one of the at least two image sensor systems being oriented along a transverse axis of the vehicle;
for each image sensor:
determining at least one fixed image point from the generated image information, each image point corresponding to a stationary object;
determining image coordinates of at least one fixed image point in at least two images of one image sequence;
determining a sampling vector drawn from a zero coordinate point of the image sensor to the at least one fixed image point; and
determining x, y and z component values of the sampling vector;
determining at least one measured value as a function of a variation in the sampling vector component values from one image in a respective image sequence to a subsequent image in the respective image sequence, of each of the image sensors, the measured value being used for vehicle dynamics control; and
controlling, by at least one actuator, vehicle dynamics as a function of the at least one measured value and the image information.

2. The method as recited in claim 1, wherein each image sensor system is a stereo camera.

3. The method as recited in claim 1, wherein the at least two images of one image sequence are successive.

4. The method as recited in claim 1, wherein, as a measured value, at least one of: i) a rotational vector of the motor vehicle and ii) at least one motion vector of the motor vehicle, are determined from the generated image information.

5. The method as recited in claim 1, wherein the at least one measured value is at least one of a yaw rate, a yaw angle, and a lateral acceleration of the motor vehicle.

6. The method of claim 1, wherein a viewing direction of the first one of the at least two image sensor systems is oriented towards a direction of travel and a viewing direction of a third one of the at least two image sensor systems is oriented towards a direction opposite to the direction of travel.

7. The method as recited in claim 1, further comprising:
determining the existence of a yawing motion when the variation involves:
a change in the value of x-components of the sampling vectors from the longitudinally oriented image sensor system, in different directions relative to a vehicle-fixed coordinate system in which the x-direction is along a longitudinal vehicle axis, and
a change in the value of y-components of the sampling vectors from the longitudinally-oriented image sensor system, in the same direction relative to the vehicle-fixed coordinate system; and
responsive to determining the existence of the yawing motion:
determining a yaw rate as a function of the rate of change in the x- and y-components, and
determining a yaw angle as a function of an integrated yaw rate.

8. The method as recited in claim 1, further comprising:
determining the existence of a rolling motion when the variation involves:
a change in the value of z-components of the sampling vectors of from the longitudinally oriented image sensor system, in different directions and to a different extent relative to a vehicle-fixed coordinate system in which the x-direction is along a longitudinal vehicle axis, and
a change in the value of x-components of the sampling vectors from the longitudinally-oriented image sensor system to the same extent relative to the vehicle-fixed coordinate system; and
responsive to determining the existence of the rolling motion:
determining a roll rate as a function of the rate of change in the z- and x-components, and determining a roll angle as a function of an integrated roll rate.

9. The method as recited in claim 1, further comprising:
determining the existence of a pitching motion when the variation involves:
 a change in the value of z-components of the sampling vectors of an image from the longitudinally oriented image sensor system, in the same direction and to the same extent relative to a vehicle-fixed coordinate system in which the x-direction is along a longitudinal vehicle axis, and
 a change in the value of x-components of the sampling vectors of the image from the longitudinally-oriented image sensor system, to the same extent relative to the vehicle-fixed coordinate system; and
responsive to determining the existence of the pitching motion:
 determining a pitch rate as a function of the rate of change in the z- and x-components, and
 determining a pitch angle as a function of an integrated pitch rate.

10. The method as recited in claim 1, further comprising:
determining a velocity vector as a function of a change in one of an x-component, a y-component and a z-component of the sampling vectors from one of the at least two image sensor systems; and
correcting the velocity vector determination by taking into account any influence by roll, pitch and yaw.

11. The method as recited in claim 1, wherein the at least one measured value is at least one of a rotational vector, a rotational angle and a velocity vector.

12. The method as recited in claim 1, wherein the at least two image sensor systems include a third image sensor system oriented in a direction opposite to the first one of the at least two image sensor systems and a fourth image sensor system oriented in a direction opposite to the second one of the at least two image sensor systems, the method further comprising:
redundantly determining a motion of the vehicle using information from all four image sensor systems.

13. A device for vehicle dynamics control in a motor vehicle, comprising:
at least two image sensor systems, each image sensor system including at least two image sensors, the at least two image sensors configured to record a same scene, a first one of the at least two image sensor systems being oriented along a longitudinal axis of the vehicle and a second one of the at least two image sensor systems being oriented along a transverse axis of the vehicle; and
at least one actuator which is driven by a processing unit/control unit as a function of at least one measured value for vehicle dynamics control and the image information,
wherein the processing unit/control unit includes an arrangement configured to:
for each image sensor:
 determine fixed image points from the generated image information, each image point corresponding to a stationary object,
 determine image coordinates of the at least one fixed image point in at least two images of one image sequence,
 determine a sampling vector drawn from a zero coordinate point of the image sensor to each fixed image point, and
 determine x, y and z component values of each sampling vector; and determine the measured value as a function of a variation in the sampling vector component values from one image in a respective image sequence to a subsequent image in the respective image sequence, of each of the image sensors, the measured value being used for vehicle dynamics control.

14. The device as recited in claim 13, wherein each image sensor is a stereo camera.

15. The device as recited in claim 13, wherein the at least two images are successive.

16. The device as recited in claim 13, wherein the processing unit/control unit includes an arrangement configured to determine at least one of i) a rotational vector of the motor vehicle, and ii) at least one motion vector of the motor vehicle, from the generated image information.

17. The device as recited in claim 13, wherein the processing unit/control unit includes an arrangement configured to determine at least one of: i) a yaw rate, ii) a yaw angle, and iii) a lateral acceleration of the motor vehicle, from the generated image information.

18. The device as recited in claim 13, further comprising:
an arrangement configured to determine at least one rotational vector of the motor vehicle, as a function of a variation in component values of corresponding sampling vectors across the sequence of images, the at least one rotational vector being, at least one of a yaw rate and a yaw angle.

19. The device as recited in claim 13, further comprising:
an arrangement configured to determine at least one motion vector of the motor vehicle as a function of a variation in component values of corresponding sampling vectors across the sequence of images, the at least one motion vector being a lateral acceleration.

20. The device as recited in claim 13, wherein the at least two image sensor systems further include a third image sensor system oriented in a direction opposite to the first one of the at least two image sensor systems and a fourth image sensor system oriented in a direction opposite to the second one of the at least two image sensor systems, and image information received from all four image sensor systems is usable to redundantly determine a motion of the vehicle.

21. A storage medium storing a computer program, which is executable by a computer, comprising:
a program code arrangement having program code for performing the following:
 processing image information from at least two image sensor systems, each image sensor system including at least two image sensors which record a same scene for the image information, a first one of the at least two image sensor systems being oriented along a longitudinal axis of a motor vehicle and a second one of the at least two image sensor systems being oriented along a transverse axis of the vehicle;
 for each image sensor:
  determining at least one fixed image point from the generated image information, each image point corresponding to a stationary object;
  determining image coordinates of at least one fixed image point in at least two images of one image sequence;
  determining a sampling vector drawn from a zero coordinate point of the image sensor to the at least one fixed image point; and
  determining x, y and z component values of each sampling vector;
 determining at least one measured value as a function of a variation in the sampling vector component values from one image in a respective image sequence to a subsequent image in the respective image sequence, of each of the image sensors; and controlling at least one actuator for vehicle dynamics control based on the at least one measured value and the image information.

22. The storage medium of claim 21, wherein the at least two image sensor systems further include a third image sensor system oriented in a direction opposite to the first one of the at least two image sensor systems and a fourth image sensor system oriented in a direction opposite to the second one of the at least two image sensor systems, wherein the program code also performs the following:

redundantly determining a motion of the vehicle using information from all four image sensor systems.

* * * * *